Aug. 4, 1959

E. J. HOUDRY ET AL 2,898,202

GAS TREATING APPARATUS

Filed Oct. 24, 1955

INVENTOR.
EUGENE J. HOUDRY
MICHEL A. COUDRAY
MYRIAM R. ERIKSSON
BY
ATTORNEY

United States Patent Office 2,898,202
Patented Aug. 4, 1959

2,898,202

GAS TREATING APPARATUS

Eugene J. Houdry, Ardmore, and Myriam R. Eriksson, Havertown, Pa., and Michel A. Coudray, Tours, France, assignors to Oxy-Catalyst, Inc., a corporation of Pennsylvania Application October 24, 1955, Serial No. 542,218

7 Claims. (Cl. 23—288)

This invention relates to gas treating apparatus particularly of the type involving catalytic oxidation. The invention is herein disclosed in the interest of convenience with specific reference to the purification of internal combustion engine exhaust gases although other uses for the invention will be apparent to those skilled in the art to which it appertains.

It has long been recognized that the malodorous or otherwise objectionable components of gases, such as smoke, carbon monoxide, odoriferous hydrocarbons, etc., can be eliminated and the gases rendered innocuous by catalytic oxidation, however, practical considerations have in the past impeded widespread adoption of catalysis as a fume abatement process. One frequently-encountered difficulty is that of maintaining the catalyst at its operating temperature. As is commonly known, catalytic oxidation reactions will proceed to substantial completion only if some minimum temperature, usually substantially in excess of the ambient temperature, is maintained at the catalyst. The actual operating temperature required in a particular instance will vary with such factors as the activity and the type of the catalyst employed and the type of oxidizable constituents in the gas stream and will usually be within the range of about 500° F. to 1400° F.

Under some circumstances it has been found that the required operating temperature can be maintained by the effect of the heat released during the catalytic oxidation of the fumes and/or the sensible heat of the gases entering the catalyst. Such desirable circumstances arise in some cases of gasoline engine exhausts and effluent gases from drying or the like ovens in which oxidizable solvents are volatilized. Under other circumstances, however, it has been found that heat must be supplied from some external source to maintain the catalyst operating temperature, by reason of either low gas inlet temperatures at the catalyst and/or by reason of low concentrations of oxidizable constituents in the gas stream. Exhausts from diesel engines, for example, and under many circumstances low temperature, low solvent-content gases from drying ovens cannot be successfully catalytically purified without the addition of extraneous heat.

Where extraneous heat additions are required for catalytic fume elimination, the amount of heat supplied should, for reasons of economy, be minimized insofar as is consistent with substantially complete cleanup. The cost of supplying heat to maintain the catalyst at its operating temperature can be, and often is, the most critical factor involved in decisions regarding the adoption of a catalytic fume elimination process, particularly where the heat cannot be recovered in some manner as by a waste heat boiler. This is particularly true in the case of diesel engine exhausts which are highly noxious. Users of such engines have in the past, however, frequently hesitated to install catalytic fume elimination equipment because of the added cost of supplying heat to maintain the catalyst operating temperature.

It is an object of the invention to provide catalytic gas treating apparatus embodying a pair of catalyst containing beds and means for injecting fuel into the reactant gases, the fuel injecting means being so arranged that the added fuel is thoroughly intermixed with the gases before it is oxidized in the catalyst containing beds. The significance of this object of the invention stems from the fact that if a non-homogeneous mixture of fuel and gases is passed through a catalyst bed, localized hot spots will develop in those areas of the bed through which the high fuel content gases pass while other areas are cooled to a relatively low temperature level because of the low fuel concentration of the gases passing therethrough. This condition, in extreme cases, can lead to overheating and possible destruction of the catalytic properties of some areas of the bed while other areas are ineffective in their catalytic function because of their low temperature.

It is a further object of the invention to provide a catalytic gas treating apparatus embodying a pair of catalyst containing beds and fuel injecting means operative to inject fuel with the gases while they are at, or near, the maximum temperature they attain while passing through the beds. The structural arrangement of the apparatus is such that this object of the invention is achieved in a device which is compact and accessible so that the invention can be utilized in environments where dimensional considerations are critical, such as in connection with automotive or fork-lift truck engines and diesel powered mining equipment.

Further objects of the invention will be apparent from the following description and the annexed drawings in which.

The disclosed embodiment of the invention is particularly intended for use in connection with the purification of diesel exhausts and to this end provides means for admixing diesel fuel with the gases being treated for the purpose of maintaining the catalyst operating temperature. It is not intended that the invention be limited to usage with diesel engines however, since the principles involved are applicable in other circumstances where it is desired to catalytically purify fumes which are so deficient in chemical and/or sensible heat as to be incapable of maintaining the catalyst temperature.

Figure 1:
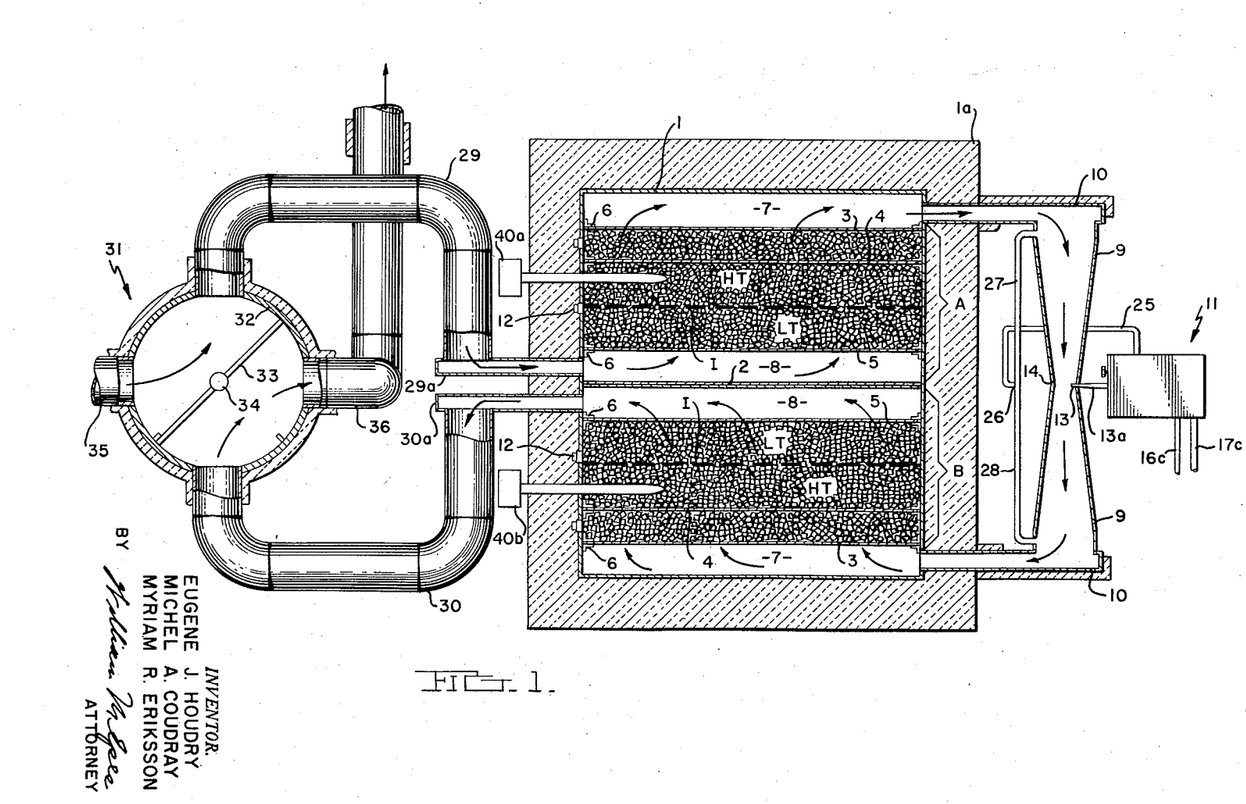
Fig. 1 is a sectional view of a preferred embodiment of the invention taken along the lines 1—1 of Fig. 2.
Figure 2:
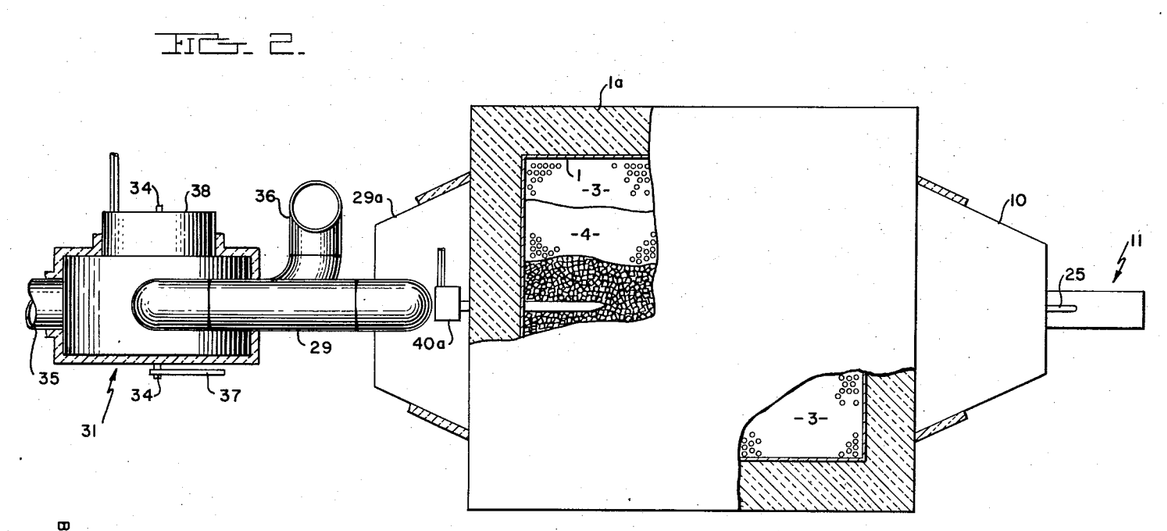
Fig. 2 is a top plan view of the embodiment of Fig. 1.

Referring particularly to Figs. 1 and 2, the reference numeral 1 denotes a metallic housing provided interiorly thereof with a divider plate 2 which divides the housing into a pair of chambers A and B. The housing itself should be substantially pressure tight and the plate 2 should be welded or otherwise secured to the housing walls in such manner as to seal the chambers A, B each from the other. The plate 2 serves as a common wall between the two chambers A, B and as will be more fully explained below, permits a modicum of heat exchange between gases flowing in the chambers.

Foraminous trays 3, 4, 5 are mounted within each of the chambers A, B by means of brackets 6 which are secured to the housing 1 as by welding in spaced apart pairs in such manner that the upstanding flanges of each pair of brackets constitute an edge receiving guideway for one of the trays. Since portions of the trays may attain temperatures in excess of 1200° F. in operation, it is desirable to permit some free thermal expansion of the trays in order to avoid thermal stressing. In the disclosed embodiment, this is accomplished by providing the trays in a width slightly less than the width of the housing so that the trays can freely expand and contract in response to temperature fluctuations. The trays should be of temperature resistant material, such as stainless steel, and should be provided with the maximum number of openings for passage of gases consistent with the adequate strength. One suitable type of tray, for example, consists of 22 gage (0.032" thickness) stainless steel plate perforated by 0.062" dia. holes in staggered rows on ⅛" centers.

The space between the trays 5 and 3 of each of the chambers A, B is filled with a bed of solid material, preferably particulate, and includes a suitable catalyst operative to oxidize both fuel for maintaining an elevated reaction temperature and the oxidizable constitutents. In our preferred embodiment the catalytic material is concentrated in the space between trays 3 and 4 while the space between trays 4 and 5 is occupied by a suitable inert refractory having a relatively high density and therefore a relatively high capacity to store heat per unit volume. The trays 4 thus serve the purpose of separating the inert portions of the bed from the catalytic portions. It should be mentioned at this point, however, that it is within the scope of the invention to homogeneously intermingle catalyst with inert material in each bed throughout its depth or alternatively to provide the beds entirely of catalyst as will be explained more fully below.

The inert material contained between trays 4 and 5 should desirably have a high capacity to store heat relative to its volume as previously mentioned, and should have good heat exchange characteristics with gases flowing therethrough. At the same time the pressure drop through the beds should be maintained at a minimum level. Irregularly shaped fused alumina particles have been found to be well suited insofar as the desideratum of high capacity to store heat is concerned. The size of the particles of inert material will, of course, to a large extent determine the pressure drop and the heat exchange coefficients between the gases and the particles. Relatively large particles are most desirable from the standpoint of maintaining a low pressure drop while relatively small particles are preferable if the heat exchange characteristics of this inert portion of the bed are to be maximized. As a practical matter it has been found that an average particle size of between about 6 and 8 mesh is desirable for gases from a diesel engine. Smaller inert particles might be employed where considerations of pressure drop are of less importance than is the case in purifying engine exhausts where high backpressures detract from engine efficiency.

The catalyst contained between trays 4 and 4 may be of any suitable type which is operative to catalyze the oxidation reactions (both fume purification and fuel oxidation) being carried out within the apparatus. Pellet type catalysts, consisting of cylindrical particles, of about ⅛" to ¹⁄₁₆" diameter and the same length, composed of an impregnated form of a catalytic oxide have been found to be well suited to the practice of the instant invention. A preferred catalyst consists of pellets of catalytic alumina impregnated with a minor amount of platinum, the impregnation being accomplished by immersion of the pellets in a solution of chloroplatinic acid followed by thermal decomposition in situ of the solution adhering to the pellets. Alternatively, catalytic forms of other oxides such as beryllia, thoria, and magnesia impregnated with alternative catalytic metals such as copper, palladium, etc., may be employed. The size of the pellets will, of course, effect the pressure drop through the beds in the same manner as the size of the inert particles.

Preferably, the beds are fairly tightly packed as to both the catalyst and the inert material since, in operation, the gas velocities are sometimes equal to and possibly greater than those at which the phenomenon of fluidization of the bed (i.e. continuous boiling or suspension of the particles in the gas stream) takes place. Such fluidization should be avoided, not only because of the possibility of resulting attrition and/or fragmentation of the bed material but because of the fact that if the bed is not maintained static, sharp thermal boundaries between the hot and cold portions of the bed are not maintained resulting in higher heat losses in the outgoing gases. It is desirable to provide removable plugs 12 for the purpose of permitting access to the beds for inspection and replacement of the catalyst. Alternatively, removable access panels (not shown) may be provided in the housing 1 for the same purpose.

The beds of catalyst and inert material in each of the chambers are preferably spaced from the common wall 2 and the ends of the chambers to thereby provide an open space 7 in each chamber at the end and a second open space 8 between the trays 5 and the common wall. Conduit means 9 is provided in communication with each fo the open spaces 7 for the purpose of conveying gases from either of the open spaces 7 to the other. This conduit means preferably provides a distributor 10 at each end to facilitate flow of gases from and into the open spaces 7 and for the additional purpose of assuring uniform distribution of gases entering the chambers, and a restricted portion 14 intermediate the ends which functions as the throat of a venturi as explained below. Means, generally indicated by the reference numeral 11, is provided for intermixing fuel with gases flowing in conduit 9.

The arrangement described thus far provides beds in back-to-back relationship with the frontal portions of the beds (i.e. the catalyst containing portions) facing in opposite directions. As will be explained more fully below, gases being treated first flow from the back to the frontal portion of one of the beds and into an open space 7, through a distributor 10 and through conduit 9 to the other open space 7 and through the other bed, the required fuel being intermixed during passage of the gases in the conduit 9. This arrangement provides several distinct advantages, one of which is that the fuel is admixed with the gases while they are flowing within the relatively constricted area of conduit 9 so that the fuel is substantially equally distributed in all parts of the gas stream. In this same connection, the gas-fuel mixture flows in conduit 9 for a substantial distance (i.e. from the point of admixture to an open space 7) before it is introduced into the catalyst bed. This initial uniform distribution of the fuel, coupled with the fact that the gas-fuel mixture must traverse half of the total length of conduit 9 before oxidation. results in the attainment of a substantially completely homogeneous fuel-gas mixture at the front of the bed in which the oxidation takes place. This feature of the invention minimizes the tendency towards the development of hot spots which tend to develop when a non-homogeneous fuel-gas mixture is passed through a catalyst bed, and contributes to the effectiveness of cleanup.

A further advantage of the disclosed arrangement of the beds is that the overall length of the apparatus, as measured from bed face to bed face. is considerably less than that of prior art devices by virtue of the fact that the fuel intermixing equipment is provided externally of, rather than within the housing 1. As pointed out above, the fuel must be homogeneously intermixed with the gases before oxidation of the fuel takes place and it has been found that to mount the fuel intermixing apparatus internally of the housing between the catalyst beds requires a substantial lengthening of the distance between the beds in order to assure adequate mixing. Moreover, the distributors for the fuel under such circumstances must be relatively elaborate in order to achieve a homogeneous mixture. The present invention avoids these difficulties while permitting a substantial reduction in the size of the apparatus which is of particular importance in automotive installations.

In the disclosed embodiment, an insulating jacket 1a is provided which encases the housing 1, the distributors 10 and the conduit 9 for the purpose of minimizing heat losses by radiation convection and conduction. The insulating jacket 1a or at least those portions of it immediately adjacent the housing 1, should be resistant to temperatures as high as about 1300° F. since, in operation, the temperature of the housing 1 may approach this level. In the disclosed embodiment the insulation covers the entire housing including the plugs 12 so that the insulation covering these plugs must be removed when the bed material is changed. This arrangement has proved satisfactory inasmuch as the bed material requires only infrequent renewal at most. However, under some circumstances it might prove desirable to provide the insulating jacket in such manner that the plugs 12 are accessible without removing any of the insulation, for example by providing openings extending through the insulation to each of the plugs.

The fuel injecting means illustrated in the drawings for intermixing diesel or other liquid fuel with the gases operates on a principle somewhat similar to that of an ordinary carburetor and to this end provides a discharge nozzle 13 which communicates with conduit 9 at a restricted portion 14 thereof. The conduit 9 on each side of the restricted portion 14 tapers outwardly to the normal conduit diameter in such manner that the restricted portion 14 constitutes the throat of a symmetrical venturi. Preferably the angle of taper should be about 6° for optimum venturi performance with a maximum of recovery on the downstream side of the throat 14. Discharge nozzle 13 communicates by means of a passage 13a (Fig. 4) through an orifice 13b with a fuel well 15 having a submerged metering orifice 15a in the lower portion thereof. A passage 15b connects well 15 at its lower portion and below the metering orifice with a quiescent reservoir 16 which in turn communicates by means of a passage 16a with an overflow reservoir 16b into which fuel flows through a line 16c. Line 16c taps the by-pass line from the fuel injection pump (not shown) of the engine fuel system. Alternatively, a separate pump can be provided for this purpose. Both reservoir 16 and reservoir 16b open at their upper ends into an open space 17 which communicates with a sump 17a having an opening 17b in the bottom thereof. A condut 17c conveys fuel from sump 17a to the fuel storage tank as will be subsequently explained.

Figure 4:
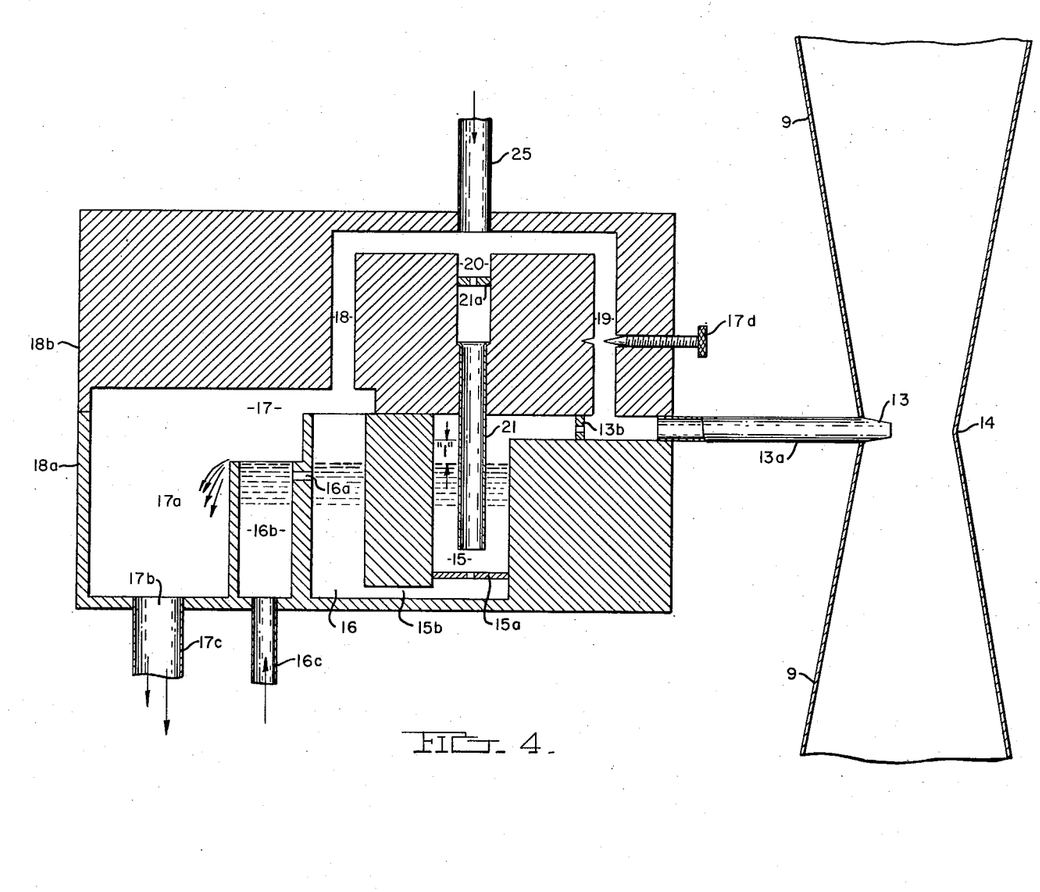
Fig. 4 is a sectional view of a preferred form of fuel intermixing means.

The body of the carburetor is formed in two pieces as indicated by the reference numerals 18a and 18b which are secured together by any suitable means. Upper portion 18b is provided internally thereof with a system of passageways 18, 19 and 20 which come together and are in communication with a pressure line 25. Passageway 20 is in communication with a tube 21 contained within the lower portion 18a of the carburetor body, which extends into fuel well 15. Passageway 18 communicates with open space 17 while passageway 19 communicates with passageway 13a at a point downstream from orifice 13b. A needle valve 17d is provided for the purpose of regulating flow through passageway 19. Pressure line 25 communicates at 26 with a pair of lines 27, 28 (Fig. 1) which open into conduit 9 at points above and below the restricted portion 14 so that the pressure within the three passageways 18, 19 and 20 adjacent the pressure line 25 is a mean between the static pressures upstream and downstream of the venturi throat 14.

In operation, fuel continuously flows into reservoir 16b and maintains a fuel level as indicated by the broken lines shown. The excess of fuel spills over into sump 17a and is returned to the fuel tank through conduit 17c. Quiescent reservoir 16 and well 15 are maintained filled to the fuel line indicated on the drawing by flow of fuel through passages 16a and 15b. The purpose of providing a separate quiescent reservoir 16 for the fuel supply is to assure a steady flow of fuel through passage 15b from a quiet non-turbulent source. Since fuel continually flows through overflow reservoir 16b, the latter reservoir is not suitable as such a source.

The open space 17 is pressurized by virtue of the passage 18 and the line 25. The static pressure existing in open space 17 will be dependent upon the flow rate of gases through the apparatus since the temperature of the gases passing through conduit 9 is substantially constant. The static pressure existing within the tube 21 and below the orifice 21a will initially be about the same as the pressure in open space 17 since the orifice 21a will not materially effect this pressure when there is no flow therethrough. The pressure at the restricted portion 14 of the conduit 9 will of course be less than the pressure at either of the points at which pressure lines 27 and 28 open into the conduit and will therefore be less than the pressure in open space 17.

Fuel flow through passage 13a to nozzle 13 commences when the pressure differential between the restricted portion 14 of the conduit 9 and the open space 17 exceeds that required to raise the level of fuel in well 15 the distance "l." When this happens, the pressure within the passage 20 will cause the liquid level within the tube 21 to drop somewhat. As the flow rate of the gases increases the rate of fuel flow increases rather sharply and the level of fuel in tube 21 drops. When this level of fuel reaches the lower end of the tube 21 gas bubbles will be released at the lower end and intermix with the fuel being injected and this "gas bleed" will continue at all pressures above this threshold pressure. As a result, further increases in pressure cause a somewhat smaller increase in the rate of adding fuel.

Figure 5:
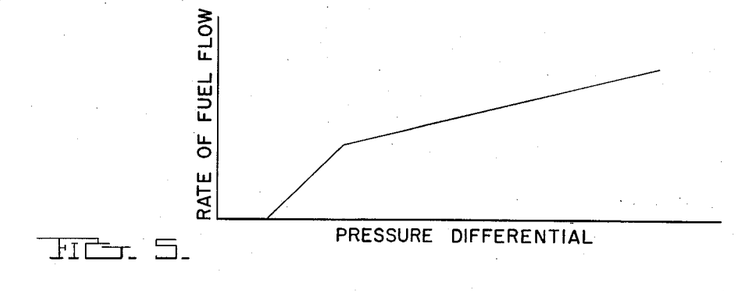
Fig. 5 is a performance curve of the fuel intermixing means of Fig. 4.

This aspect of the operation of the carburetor is best understood from Fig. 5 wherein the abscissa represents the pressure differential between the open space 17 and the outlet of the nozzle and the ordinate represents the rate of fuel flow. As is apparent from this figure, the rate of fuel flow increases rapidly with increasing pressure differentials until the threshold pressure differential (at which "gas bleed" commences) is reached after which the rate of increase of fuel flow greatly decreases.

In practice, the threshold pressure differential, at which "gas bleed" from the end of tube 21 commences, should be selected as that pressure differential existing at the minimum rate of gas flow through the apparatus so that the increase of fuel flow with pressure differential is relatively low. This can be accomplished by judicious selection of the length of tube 21 relative to the depth of fueling well 15. Fine adjustments as to the rate of fuel flow can be accomplished by means of the set screw 17d which permits additional gas bleed over and above that from the lower end of tube 21. The exact slope of the curve from the threshold pressure differential upwards is determined to some extent by the characteristics of the orifice 21a.

As will be seen below, the rate of adding fuel in the case of engine exhausts is relatively low, of the order of about 3.6 to 7.0 cc./min. for a 153 in.³ piston displacement engine. The disclosed carburetor arrangement is capable of metering fuel in such small amounts and, moreover, providing the requisite degree of response for varying fuel flow rate with engine speed.

The continuous circulation feature of the disclosed carburetor presents distinct advantages over the conventional needle valve type because of the rather low fuel flow rates required for the process. With a needle valve type carburetor the inevitable leakage past the needle valve, resulting from vibratory unseating of the valve, would soon cause the sump 17a to be completely filled so that the rate of injecting fuel into the gas stream would be dependent upon the pressure differential between the restricted portion 14 of the conduit and the pressure of the fuel itself rather than upon the pressure differential between the restricted portion 14 and the ends of the conduit 9.

The disclosed arrangement is particularly desirable inasmuch as the rate at which the fuel is intermixed with the gases depends solely upon the mass flow of gases and is independent of the absolute pressure in the conduit 9, this absolute pressure being dependent to some extent upon apparatus variables such as the degree to which the bed is packed (i.e. either tightly packed or loosely packed), the particle size and size distribution of the bed material, and the extent, if any, to which the interstices in the bed are clogged with particles, such as carbon particles, from the gas stream. For a given size of the conduit 9 and a venturi of given characteristics, the pressure difference between the pressure at the venturi throat and the mean pressure of the two ends of conduit 9 will be solely dependent upon the mass flow of gases, assuming, of course, that the gases are at a substantially constant temperature.

The desirability of utilizing pressure reference points both above and below throat 14 stems from the fact that the pressure recovery of gases flowing through a venturi throat is, as a practical matter, always less than 100%. In other words the static pressure downstream of venturi throat 14 will always be less than the static pressure upstream of the venturi throat. Since the direction of gas flow through the apparatus is periodically reversed, it is desirable to utilize an average or mean of the static pressures upstream and downstream of the venturi rather than the pressure on one side of the venturi for pressurizing the float chamber.

Instead of the disclosed means of injecting fuel into the gas stream other devices may be employed. In the oxidation of diesel fumes, the preferable fuel from the standpoint of convenience and economy is the fuel utilized by the engine. A simple fuel injection means such as a simple fuel jet for injecting gaseous fuel such as propane may, if desired, be employed where the circumstances permit utilization of gaseous fuel. With such an alternative arrangement a metering device would be required for the purpose of regulating the fuel input relative to the flow of reactant gases.

The introduction of gases into and exhausting gases from chamber 1 is accomplished by means of conduits 29, 30 in communication with each of the open spaces 8 at one end thereof and in communication with a valve 31 at the opposite end, as indicated by the drawing. These conduits are preferably provided with distributors 29a, 30a, as shown in Figs. 1 and 2, for the purpose of uniformly distributing entering gases within the chambers and thereby contributing to the uniformity of the operation of the apparatus. In the disclosed embodiment, the valve 31 is provided with a valve body 32 having a vane 33 mounted interiorally thereof on a shaft 34, the shaft 34 having a lever 37 (Fig. 2) attached thereto externally of the valve body to permit manual operation of the valve. Raw gases from the engine are admitted to the valve body by means of a conduit 35 and purified gases are exhausted from the valve body by means of an exhaust conduit 36. Preferably the valve body and the conduits 29, 30 are thermally insulated as shown for the purpose of minimizing heat losses in the incoming gases.

As is apparent from Fig. 1, with the vane 33 in the position shown, gases entering the valve body will flow through conduit 29 into open space 8 of the upper chamber A, through the bed therein, through conduit 9 to open space 7 of lower chamber B, through the bed in chamber B and will be exhausted by conduit 30 and exhaust conduit 36. Rotation of the damper 33 through an angle of 90° in a clockwise direction from the position of Fig. 1 will, of course, result in gas flow in the opposite direction from the arrows shown in Fig. 1. In normal steady flow operation the valve is periodically switched by means of a switching device 38 which is thermally responsive to the temperatures in the beds of the apparatus. This switching device and the control means therefor are more fully described below.

In normal operation of the apparatus, the catalytic portions of the beds within the two chambers A and B, are always maintained within an elevated temperature range at which the catalyst is operative to oxidize both the fumes and the injected or intermixed fuel. The actual temperature required may vary for different fuels, fumes, and for different catalysts. Where the fumes being purified consist of exhausts from a diesel engine and the fuel utilized is ordinary diesel fuel oil, the preferred temperature is in the neighborhood of about 1000°–1250° F. for the type of alumina-platinum catalyst described above. Under some circumstances it will be found that lower maximum temperatures are sufficient; for example, where carbon monoxide is utilized as a fuel and where the gases being purified are more readily amenable to catalytic oxidation than ordinary diesel fumes. In any event, the catalytic beds must be operative to oxidize both the fumes and the fuel and, as a general rule, it is essential that the bed be maintained at a rather elevated temperature for this purpose.

The inert portions of the beds, in normal operation of the apparatus function as heat reservoirs of varying sensible heat content and, as previously explained, serve the purpose of preheating the exhaust gases to the requisite reaction temperature and extracting heat from the gases after catalytic oxidation of the fuel. The operation is best understood from a consideration of idealized operating conditions in which the gas-to-solid heat exchange coefficients are assumed to be infinite and the thermal conductivity of the beds (i.e. from one particle to another) is assumed to be zero. Accordingly, in the description which follows such idealized conditions are assumed. The operation of the apparatus under actual conditions of finite heat exchange coefficients and normal thermal conductivity is considered hereinbelow.

Under the idealized operating conditions the inert bed portion of each of the beds is characterized by a high temperature zone which extends from the line of demarcation between the catalytic and inert bed portions (i.e. the trays 4) toward the back of the bed at the tray 5 but which terminates short of the back of the bed. Each of the beds also contains a relatively low temperature bed zone which extends from the back of the bed, at the tray 5, towards the front of the bed and which terminates at the high temperature zone described above. The actual temperature within this low temperature bed zone will ideally be the same as the inlet temperature of the gases being treated, for example in the case of diesel exhausts about 300–500° F. The actual temperature within the high temperature zone will be dependent to a large extent upon the amount of fuel injected into the gases and, as previously mentioned, in the case of diesel exhausts will preferably be about 1000°–1250° F. if diesel fuel is injected into the stream.

Under the idealized circumstances of infinite heat exchange coefficients between the gases and the bed material, the low temperature zone and the high temperature zone would be separated by an extremely sharp thermal boundary upon one side of which the temperature would be equal to the inlet gas temperature and the other side of which the temperature would be higher depending upon the amount of fuel being injected. In Fig. 1, such a thermal boundary is shown by the broken line indicated by the letter I, the letters LT and HT respectively indicating the low temperature and high temperature bed zones.

Upon passage of reactant gases through the apparatus in the direction of the arrows of Fig. 1, the idealized thermal boundary I would be moved upwardly towards the catalytic bed portion. The migration of this boundary would, of course, result from the fact that the gases would extract heat from the high temperature bed zone and, under the idealized conditions of infinite heat exchange coefficients, the thermal boundary would remain sharp and distinct as described above. Passage of the gases through the catalytic bed portion in upper chamber A will result in oxidation and elimination of the contaminants in the gases, since, as previously explained, the catalytic bed portions are maintained at an elevated temperature at which the catalyst therein is operative to oxidize the combustible constituents of the stream.

The fuel which is injected into the gas stream during passage through conduit 9 is oxidized in the catalytic portion of one of the beds, for example when the gases are flowing in the direction of the arrows of Fig. 1, the fuel will be oxidized in the catalytic portion of the lower bed in chamber B. The heat liberated by this oxidation of the fuel maintains the beds at the desired operating temperatures and maintains the heat content of the beds at the proper level notwithstanding the continual losses of heat due to radiation and the outgoing gases. During passage through the high-temperature zone of this bed portion, no heat exchange will take place under idealized conditions but the temperature of the gases will be reduced upon crossing the thermal boundary I and entering the low temperature bed portion. The thermal boundary within the bed in lower chamber B will thus be moved upwardly and, as with the bed in chamber A, the thermal boundary will remain sharp and distinct. Under these idealized conditions the outlet temperature of the gases in conduit 30 would be exactly equal to their inlet temperature in conduit 29.

The migration of the thermal boundaries as above explained results in a change in the sensible heat contents of the beds. When the gases are flowing as in Fig. 1, the sensible heat content of the upper bed in chamber A decreases while that of the lower bed increases. Reversal of the direction of flow of the gases is effected when the thermal boundaries approach the limits of their permissible travel, i.e. the tray 4 in the bed of upper chamber A and the tray 5 for the thermal boundary in the bed in lower chamber B.

In actual operation, the heat exchange coefficients are high but they are not infinite. Also, there is some thermal conduction within the beds from particle to particle. The thermal boundary concept, as described above, is not therefore achieved in actual practice although the temperature gradient from the back to the front of either of the beds will exhibit a transition zone which separates a high temperature bed zone from a low temperature bed zone. The thickness of the transition zone (as measured in the direction from the back of the bed to the front) will be dependent upon the heat exchange characteristics of the bed. As previously explained, a bed of relatively small particles is desirable from this standpoint because of the superior heat exchange coefficient obtainable. The high temperature bed zone and low temperature bed zone, in actual operation, will not be of uniform temperature throughout, again because of the fact that the heat exchange coefficients are not infinite. However, where the device is operated in the optimum manner in order to minimize the fuel requirements, there will be low and high temperature zones separated by a transition zone.

In starting the apparatus it is of course necessary to preheat at least one of the catalytic portions of one of the beds to the operating temperature of the catalyst thereof. This can be accomplished for example, with relative ease in the case where the incoming temperature of the raw gases is above the operating temperature of the catalyst. Under such circumstances it is merely necessary to flow raw gases through the apparatus while restricting the flow of fuel until at least one of the beds is heated up to the exhaust gas temperature. Subsequently the direction of flow of gases through the apparatus is reversed and fuel injection is commenced. If this is done, the intermixed fuel will be oxidized on the preheated bed thereby raising its temperature until the requisite amount of heat is stored in the first bed thus heated. While this process is carried out, of course the other of the two beds will also be heated by the incoming exhaust gases so that a further reversal of the direction of flow will result in oxidation of the gaseous fuel on the catalytic portion of the other bed whereby its temperature will be increased to the proper level.

Where the exhaust gases are at a temperature less than that required in the catalyst for catalytic oxidation, it becomes necessary to add heat to the catalytic portions of at least one of the beds from an extraneous source. One method to accomplish this is to provide electrical heating units within at least one of the catalytic bed portions and preheat the bed for a short time prior to placing the device on stream. Alternatively, for low exhaust gas temperatures the necessary additional preheat may be supplied by means of a separate combustion chamber adapted to supply hot combustion products for intermixing with the exhaust gases prior to their passage through the apparatus.

Figure 3:
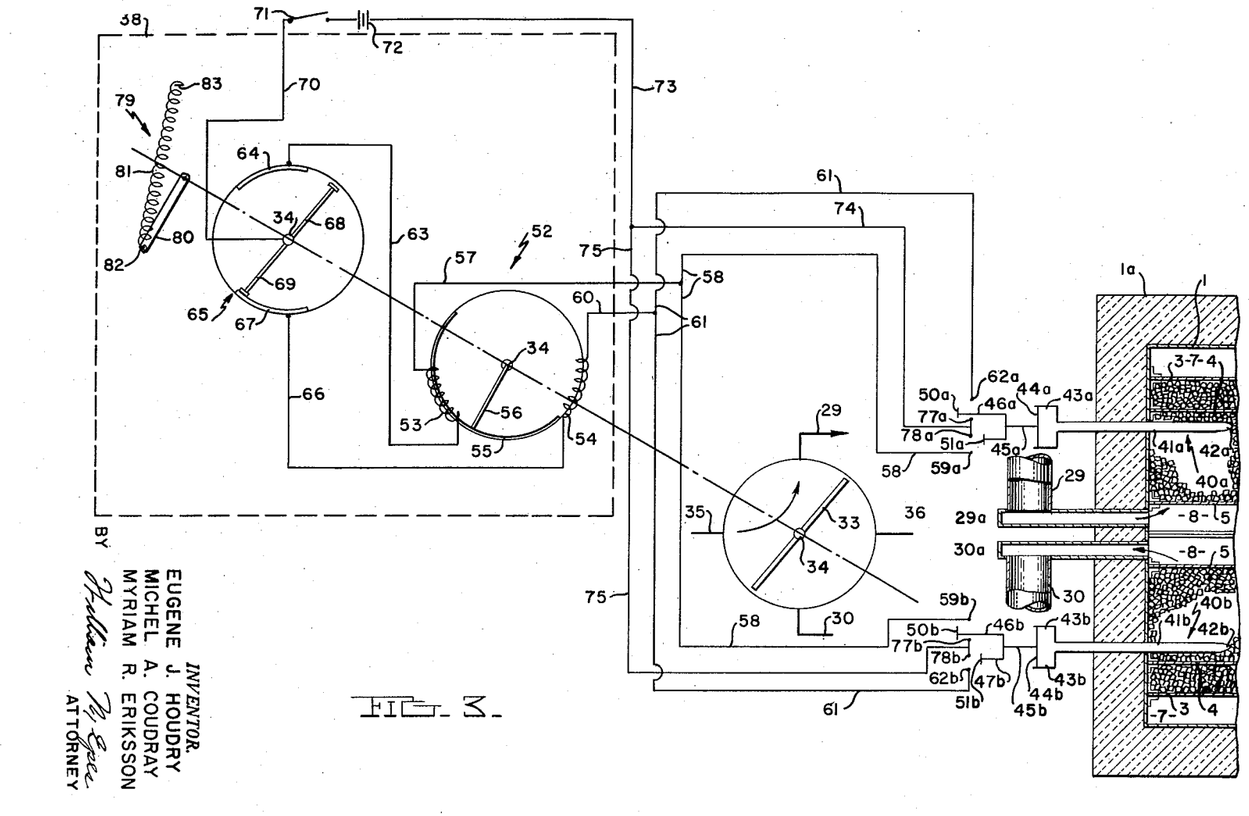
Fig. 3 is a semi-diagrammatic view of a preferred form of gas flow reversing device usable in the practice of the invention.

The periodic reversal of the direction of flow of gases through the apparatus may be accomplished by a thermally actuated electrically responsive means of the type shown schematically in Fig. 3. In this figure the reference numerals 40a and 40b generally indicate a pair of thermally responsive microswitches, the switch 40a being disposed within the chamber A and the switch 40b being disposed within chamber B. Since these switches are alike, a description of one will suffice for both although the letters "a" and "b" will be used in connection with the reference numerals indicating corresponding parts of the two switches to indicate respectively the upper switch of Fig. 1 and the lower switch.

Each of the switches consists of a tube 41a, 41b, of temperature resistant material such as stainless steel, which is closed at one end 42a, 42b, and which opens at the other end into a chamber 43a, 43b. The chambers 43a, 43b are each provided with a diaphragm 44a, 44b to which switch rods 45a, 45b are attached, the switch rods being bifurcated to provide a pair of arms 46a, 46b, 47a, 47b of unequal length. The arms in turn are provided with electrical contacts 50a, 51a, 50b, 51b which are adapted to contact electrical conductors in a manner described below. The tubes 41a, 41b contain a suitable gas or liquid such as mercury so that a temperature increase in the beds causes a pressure buildup within the tubes with resulting movement of the diaphragms outwardly and outward movement of the switch rod attached thereto while a temperature decrease causes a decrease in the pressure within the tubes, inward movement of the diaphragm and inward movement of the switch rod. The tubes 41a, 41b may be disposed either within the catalytic portions of the beds or the inert portions. As a practical matter, location of these tubes in the inert bed portions as disclosed in the drawing, is to be preferred inasmuch as the catalytic portions are, in operation, at a higher temperature than the inert portions so that tubes located in the inert portions will have a longer life than tubes disposed in the catalytic portions.

The microswitches 40a, 40b upon actuation thereof complete one of several alternative electrical circuits which in turn cause an operator 52 to rotate the valve 33 for one-quarter of a turn from the position shown in Figs. 1 and 3. The operator 52 and several other components of the valve switching means are encased within a housing 38 (Fig. 2) which is secured to the valve body 32. The housing 38 is indicated by a broken line in Fig. 3 in the interest of clarity. The shaft 34 to which vane 33 is affixed extends through the housing as also indicated by the chain line of Fig. 3.

The operator 52 consists of a pair of arcuate solenoid coils 53, 54 disposed along the curvilinear locus of an arcuate core 55 of soft iron or other material of high magnetic permeability. The curvature of this core 55 conforms to the curvature of the coils 53, 54 so that the core is adapted to travel from either coil to the other and partially enter the other upon energization thereof. An arm 56 is secured to the core 55 at a median point thereof, the arm 56 being secured to the shaft 34 to thereby cause rotation of the shaft.

The coil 53 is electrically connected at one end thereof by means of a conductor 57 to a second conductor 58 which terminates in a pair of contact elements 59a, 59b which are located adjacent contacts 51a and 50b respectively. The coil 54 is electrically connected by means of a conductor 60 to a conductor 61 which terminates in a pair of contact elements 62a and 62b disposed adjacent the contacts 50a and 51b respectively. The opposite end of the coil 53 is electrically connected by means of a conductor 63 to one of the two shoes 64 of a rotary switch generally indicated by the reference numeral 65. The coil 54 is similarly connected by means of a conductor 66 to the other of the shoes 67 of the switch 65. The rotary switch 65 further consists of a pair of electrically conductive switch arms 68, 69 which are secured to, and which turn with, the shaft 34 upon actuation of operator 52. The shoes and switch arms are arranged relative to each other in such manner that when the vane 33 and shaft 34 are in either extreme position (i.e. either in the position shown in Figs. 1 and 3 or in a position rotated 90° counterclockwise from the position of Figs. 1 and 3), only one of the switch arms 68, 69 is in electrical contact with its respective shoe. For example, with the vane 33 in the position shown in the drawing, arm 69 is in contact with its shoe 67. If the vane 33 were rotated through a 90° counterclockwise turn, arm 68 would be in contact with shoe 64. To this end, the shoes should be arcuate in shape and of greater than 45° of arc and less than 90° of arc.

Each of the switch arms 68, 69 is electrically connected by means of a conductor 70 through a manually operated switch 71 to a voltage source 72. The switch 71 is provided for the purpose of deactivating the apparatus when the engine with which it is used is taken out of service. The voltage source 72 in the disclosed embodiment comprises a battery and, in the case of an automotive installation, would, of course comprise the battery of the electrical system. The switch 71 and battery 72 are shown as being disposed externally of the housing 38. Obviously these components may be placed at any location which is most convenient to the engine operating personnel.

A conductor 73 extends from the battery and joins a pair of conductors 74, 75 at a junction 76. Conductor 74 terminates in a pair of contact elements 77a, 78a which are disposed in such manner as to be contacted by contacts 50a and 51a respectively upon actuation of microswitch 40a. Conductor 75 terminates in a pair of contact elements 77b, 78b which are disposed in such manner as to be contacted by the contacts 50b, 51b upon actuation of microswitch 40b. As is apparent from the drawing upon movement to the right of switch rod 45a, a circuit is completed from conductor 61 through contact element 62a, through contact 50a and contact element 77a to conductor 74. Movement to the left of switch rod 45a completes a circuit through conductor 58, contact element 59a, contact 51a and contact element 78a to conductor 74. Similarly, movement to the right of switch arm 45b will close a circuit connecting conductor 58 with conductor 75 while movement to the left of switch arm 45b will connect conductor 61 with conductor 75.

A spring device, generally indicated by the reference numeral 79 is provided for the purpose of retaining the shaft and vane 33 in either of their extreme positions. This spring device comprises a lever arm 80, secured to shaft 34, having one end of a coil spring 81 affixed thereto as at 82. The opposite end of the coil spring is anchored at a point 83 which is located on the line defined by the lever arm 80 when the shaft 34 is mid-way between either of its two extreme positions. By virtue of this arrangement, the lever arm 80, shaft 34 and vane 33 are not only retained in either of their extreme positions, but are also rotated to either extreme position after the shaft has been rotated through an angle of slightly greater than 45° from the opposite position under the influence of the operator 52. This arrangement in conjunction with the rotary switch 65 minimizes power requirements as will be described below.

The switching mechanism of Fig. 3 operates as follows: Assume that the vane 33 is in the position shown, the gases are flowing in the direction of the arrows, and the switch rods 45a, 45b of the microswitches are in the positions shown in Figs. 1 and 3. Reversal of direction of flow of the gases will be required as soon as either that portion of the bed in upper chamber A adjacent tube 41a becomes cool or that portion of the bed in lower chamber B adjacent tube 41b becomes unduly hot. If the bed adjacent 41a in upper chamber A becomes so cool as to require reversal of gas flow, the mercury (or other fluid) in rod 41a will contract in volume thereby causing collapse of diaphragm 44a and displacement to the right of valve rod 45a. This will cause contact 50a to seat on contact elements 62a, 77a thereby completing a circuit through 74, 72, 71, 70, 69, 67, 66, 54, 60, 61 and 62a. Coil 54 will thus be energized and core 55 will be actuated to rotate shaft 34 in a counterclockwise direction. This circuit will be closed for only a fraction of a second, however, for as soon as switch arm 69 travels past shoe 67 it will be broken. Spring 81 will then complete the rotation of shaft 34 and vane 33 and retain the vane and shaft in a position 90° counterclockwise from the position as shown.

Returning to the original set of assumed conditions (i.e. with the vane as shown in Figs. 1 and 3), if that portion of the bed in lower chamber B adjacent tube 41b attains an unduly high temperature level before that portion of the bed in chamber A adjacent tube 41a is cooled to the maximum permissible extent, the mercury in tube 41b will expand causing movement to the left of rod 45b. This will move contact 51b into engagement with contact elements 78b and 62b to complete a circuit through 75, 73, 72, 71, 70, 69, 67, 66, 54, 60 and 61. Coil 54 will thus be energized with resulting rotation of the shaft and vane 33 as described above.

When the vane is in its position 90° counterclockwise from that of Figs. 1 and 3 and the gas flow is in the reverse direction from the arrows, reversal is similarly accomplished by energization of coil 53 by movement of either of the valve rods 45a, 45b to the left or right respectively.

The disclosed valve switching means thus prevents both overheating and cooling of both of the beds regardless of the direction of gas flow. It is within the scope of the present invention to provide alternative valve switching means, either thermally responsive and electrically actuated as shown or of other types. For example, under some circumstances it might be found preferable to provide a simple timing device adapted to reverse the direction of gas flow at intervals of, say, one minute or less. This latter expedient would most likely be limited to circumstances in which the chemical composition, inlet temperature and flow rate of the gases being treated are all substantially constant. Where the invention is utilized in conjunction with gases of variable composition, temperature and flow rate such as exhausts from an internal combustion engine, it has been found that a thermally responsive valve reversing means is to be preferred because variable characteristics in the inlet gases are not conducive to steady operating conditions such as are necessary for simple time cycle reversing.

It should be noted that gases leaving the housing 1 and gases entering the housing are at all times on the opposite sides of the common wall 8. This aspect of the invention permits some exchange of heat between the outlet gases and the inlet gases and contributes to minimization of fuel requirements and economy of operation. If desired, heat exchange fins may be provided integral with common wall 8 in order to facilitate such heat exchange. The invention is susceptible to use under a wide variety of circumstances as regards the inlet temperature, chemical composition and rate of flow of the gas stream and the precise details of such matters as the size of the apparatus, the amount and type of catalyst utilized and the type of fuel injection means and fuel used will be dependent to some extent upon the specific conditions encountered. The following description of one particularized embodiment of the invention and its operation is here presented in the interest of completeness but without the intention of limiting the invention to the structural details or the operating conditions described.

An embodiment of the invention conforming substantially to the foregoing description and the drawing, Figs. 1 and 2, was constructed specifically for use in the purification of the exhaust gases of a 4-cycle, 153 in.³ piston displacement diesel engine having a maximum governed speed of 2400 r.p.m. The engine formed the power source for a fork lift truck and would in usage normally operate under conditions of continual variation of speed and load. Number 2 diesel fuel was used exclusively in the tests described.

The gas treating apparatus provided two beds, arranged as shown in Figs. 1 and 2, each of which contained a layer of catalytic pellets of about 1" in depth in its frontal portions and a 3" layer of an inert heat absorbing solid in its rear portion. The cross sectional area of each of the beds was approximately 1 ft.² and weight of the catalyst in each bed was determined to be about 5 lbs. while the weight of the inert solid was 25 lbs. The particular catalyst used consisted of cylindrical pellets of ⅛" diameter and about the same length of a catalytic grade of alumina impregnated with metallic platinum. The inert portions of the beds consisted of a mass of irregularly shaped particles of fused alumina, the largest of which had a maximum dimension of about 0.2".

In an initial series of tests, the beds within the apparatus were heated to a temperature of about 850° F. by passing therethrough hot products of combustion from a separate combustion chamber. After this bed temperature has been reached, the engine exhaust gases were passed through the apparatus as the engine itself was idled at a speed of about 750 r.p.m. The direction of flow of the exhaust gases was reversed at 1 minute intervals and No. 2 diesel fuel was intermixed with the gases, while they were passing through the conduit 9, at the rate of 3.6 cc./min. (about 0.058 gal./hr.). The temperature of the exhaust gases at the inlet to the apparatus was found to be about 275° F. and the temperature of the purified gases at the outlet of the apparatus was found to be about 400° F. The flow rate of the gases during the test was substantially constant at about 1800 s.c.f.h. (ft.³/hr. reduced to standard conditions of temperature and pressure). The maximum temperature attained in the catalytic portions of the beds was 1255° F. while the maximum temperature at the boundary between the catalytic and inert portions was between about 1000° F. and 1040 F.

During this test, the diesel exhaust after purification was observed to be substantially smokeless and odorless indicating that the oxidizable components of the exhausts were being eliminated. The test was conducted within an enclosed room and no physical discomfort, such as disagreeable odors or smarting of the eyes, were experienced by the operators or observers.

A second test was made with the engine being continually operated at a speed of 2400 r.p.m. In this test, the flow rate of the gases was found to be about 4000 s.c.f.h. and the temperature of the gases at the inlet to the apparatus was determined to be 500° F. while the gas outlet temperature was about 635° F. Fuel was intermixed with the gases at the rate of 7.7 cc./min. (about 0.12 gal./hr.) and the direction of flow of gases was reversed at intervals of one minute. The maximum temperature attained in the catalytic bed portions was about 1210° F. while temperatures in the range of 920° F. to 1080° F. prevailed at the boundary between the catalytic and inert bed portions. Again, the exhaust gases leaving the apparatus were substantially smokeless and odorless and caused no discomfort to the persons in the room in which the test was conducted.

A third test was made for the purpose of simulating the operation of the apparatus under conditions of normal engine operation. As pointed out above, for a fork lift truck engine, normal operation would include wide variations in speed and load with only short periods of steady rate operation. Accordingly the engine was operated on a cycle consisting of alternate 1 minute periods of maximum speed operation (2400 r.p.m.) and idling speed operation (750 r.p.m.). The direction of flow of gases through the apparatus was reversed on the basis of bed temperature considerations (rather than at fixed time intervals as previously described for the steady flow tests) in such manner that the catalytic portions of the beds neither overheated nor cooled unduly. Fuel input was varied in accordance with the flow rate of the exhaust gases which was determined to be 1800 s.c.f.h. during the periods of idling speed operation and 4000 s.c.f.h. during periods of maximum speed operation Again, the cleanup was substantially complete and no traces of objectionable exhaust components were perceived by the occupants of the room in which the tests were conducted.

Many obvious modifications of the invention within the scope of the appended claims will be apparent to those skilled in the art. As previously explained, it is preferable to provide each of the beds as composed of a layer of inert material and a layer of catalytic material as shown. Since the catalyst will ordinarily be somewhat more costly than the inert material, it is more economical to provide only as much catalyst as is required and utilize the cheaper inert material insofar as possible. Also, pellet catalysts of the types described above have a rather low density which means that they are not as well suited to function as a heat absorbing material as the relatively high density inert bed portions. Under some particularized circumstances, however, it might prove desirable to intermingle catalyst and inert material or to provide beds composed entirely of catalytic material.

While pellet type catalysts are herein disclosed, it should be mentioned that the catalytic bed portions might be composed of catalytic units of the type, for example, disclosed in the copending application of Eugene J. Houdry, Serial No. 159,191, filed May 1, 1950, for "Process and Apparatus for Contacting Operations," now Patent No. 2,730,434. Units of this type are well adapted to catalytic oxidation of gas streams and have been found to be effective in the catalytic purification of a wide variety of fumes.

We claim:

1. Gas treating apparatus adapted to accommodate gas flow in each of two directions in reversing cycles comprising: a pair of catalyst containing beds, each having a back portion and a frontal portion for admitting and discharging reactant gases to and from the beds, the back portion of said beds being disposed in spaced-apart face-to-face relationship with the frontal portions thereof facing in opposite directions, a common wall between said face-to-face back portions for separating said beds with respect to gas flow, means for introducing reactant gases into and exhausting reactant gases from either of said beds adjacent the back portion thereof, conduit means connecting the frontal portions of said beds to one another to permit the flow of reactant gases from the frontal portions of either of said beds to the frontal portions of the other of said beds and means for introducing fuel into said conduit and admixing said fuel with said reactant gases during flow thereof from the frontal portions of either of said beds to the frontal portions of the other of said beds.

2. Gas treating apparatus adapted to accommodate gas flow in each of two directions in reversing cycles comprising: a pair of beds, each having a back portion and a frontal portion for admitting and discharging reactant gases to and from the beds, the back portion of said beds being disposed in spaced-apart face-to-face relationship with the frontal portions thereof facing in opposite directions, a common wall between said face-to-face back portions for separating said beds with respect to gas flow, at least the frontal portions of said beds containing catalytically active material, means for introducing reactant gases into and exhausting reactant gases from either of said beds adjacent the back portions thereof, conduit means for connecting the frontal portions of said beds to one another to permit the flow of reactant gases from the frontal portions of either of said beds to the frontal portions of the other of said beds, and means for introducing fuel into said conduit and admixing said fuel with said reactant gases during flow thereof from the frontal portions of either of said beds to the frontal portions of the other of said beds.

3. Gas treating apparatus adapted to accommodate gas flow in each of two directions therethrough in reversing cycles comprising: a pair of reaction chambers having a common wall, each of said chambers being provided internally thereof with a catalytically-active bed, said beds being disposed spaced-apart in back-to-back relationship separated by said common wall and having frontal portions facing in opposite directions, means for introducing reactant gases into and exhausting reactant gases from each of said chambers adjacent the backs of the beds therein, a conduit connecting the frontal portions of said beds to one another to permit the flow of reactant gases from the front surface of either of said beds to the front surface of the other of said beds and fuel injecting means for injecting fuel into said conduit so as to add fuel to said reactant gases during flow thereof from the front of either of said beds to the front of the other of said beds whereby said injected fuel is thoroughly intermixed with said reactant gases prior to passage thereof through one of said beds.

4. Gas treating apparatus adapted to accommodate gas flow in each of two directions therethrough in reversing cycles comprising: a pair of reaction chambers having a common wall, each of said chambers being provided internally thereof with a bed of solid material, said beds being disposed in spaced-apart back-to-back relationship separated by said common wall and providing frontal portions facing in opposite directions, the frontal portions of said beds providing oxidation catalyst, means for introducing reactant gases into and exhausting reactant gases from each of said chambers adjacent the backs of the beds therein, a conduit connecting the frontal portions of said beds to one another to permit the flow of reactant gases from the frontal portions of either of said beds to the frontal portions of the other of said beds and fuel injecting means for injecting fuel into said conduit so as to add fuel to reactant gases during flow thereof from the frontal portions of either of said beds to the frontal portions of the other of said beds for catalytic oxidation therein, the catalytic frontal portions of both of said beds being operative to catalytically oxidize said injected fuel and thus be maintained at a temperature in excess of the minimum operating temperature of the catalyst thereof, the rear portions of both of said beds being adapted to function as heat reservoirs of varying heat content for preheating reactant gases to the operating temperature of said catalyst and for extracting sensible heat from said reactant gases after oxidation of the fuel injected therein.

5. Gas treating apparatus adapted to accommodate gas flow in each of two directions therethrough in reversing cycles comprising: a pair of reaction chambers having a common wall, each of said chambers being provided internally thereof with a bed of particulate material, said beds being disposed in back-to-back spaced-apart relationship separated by said common wall and providing frontal portions facing in opposite directions, the frontal portions of said beds providing an oxidation catalyst, the back portions of said bed providing an inert heat absorbing material, means for introducing reactant gases into and exhausting reactant gases from each of said chambers adjacent the back portions of the beds therein, conduit means for flowing reactant gases from the frontal portions of either of said beds to the frontal portions of the other of said beds and fuel injecting means in said conduit means for injecting fuel into said reactant gases during flow thereof from the frontal portions of either of said beds to the frontal portions of the other of said beds, the frontal portions of both of said beds being operative to catalytically oxidize said injected fuel and thus be maintained at a temperature in excess of the minimum operating temperature of the catalyst thereof, the rear portions of both of said beds being adapted to function as heat reservoirs of varying heat content means for periodically reversing the direction of gas flow through said beds and said connecting conduit in such manner that during each cycle reactant gases introduced into a first one of said chambers are heated to the reaction temperature of said catalyst during passage through the rear bed portions thereof, said gases subsequently flowing from the frontal portions of the said one of said beds through said conduit means to the frontal portions of the other of said beds while fuel is injected thereinto, said gases subsequently flowing through the frontal portions of the other of said beds wherein said injected fuel is oxidized and subsequently through said inert rear portion of said other bed wherein the temperature of said gases is reduced as the sensible heat thereof is recovered.

6. Gas treating apparatus adapted to accommodate gas flow in each of two directions in reversing cycles comprising: a pair of beds disposed in spaced-apart back-to-back relationship separated by a common wall, said beds providing catalyst-containing frontal portions facing in opposite directions and particulate, inert heat absorbing back portions, reactant gas introducing and exhausting means for introducing and exhausting reactant gases from either of said beds adjacent the back portion thereof, conduit means for flowing reactant gases from the frontal portions of either of said beds to the frontal portions of the other of said beds, said beds, said reactant gas introducing and exhausting means and said conduit means being arranged relative to each other in such manner that reactant gases introduced into one of said beds adjacent the rear portion thereof flow through said one bed, through said conduit means and through the other of said beds, means for injecting fuel into said reactant gases during passage thereof through said conduit means and means for reversing the direction of flow of reactant gases through said apparatus.

7. Gas treating apparatus adapted to accommodate gas flow in each of two directions in reversing cycles comprising: a pair of catalyst-containing beds disposed in spaced-apart back-to-back relationship separated by a common wall and providing frontal portions facing in opposite directions, means for introducing reactant gases into and exhausting reactant gases from either of said beds adjacent the back portion thereof, conduit means for flowing reactant gases from the frontal portions of either of said beds to the frontal portions of the other of said beds in such manner that reactant gases introduced into one of said beds adjacent the rear portion thereof flow through said one bed, through said conduit means and through the other of said beds, temperature responsive means for reversing the direction of flow of gases through said apparatus and means for admixing fuel with said reactant gases during flow through said conduit means.

References Cited in the file of this patent

UNITED STATES PATENTS

| | | |
|---|---|---|
| 2,208,123 | Duncan | July 16, 1940 |
| 2,218,604 | Dill | Oct. 22, 1940 |
| 2,552,277 | Hasche | May 8, 1951 |
| 2,700,598 | Odell | Jan. 25, 1955 |
| 2,720,450 | Hang | Oct. 11, 1955 |
| 2,731,335 | Odell | Jan. 17, 1956 |

FOREIGN PATENTS

| | | |
|---|---|---|
| 458,692 | Great Britain | Dec. 24, 1936 |